Figure 1:
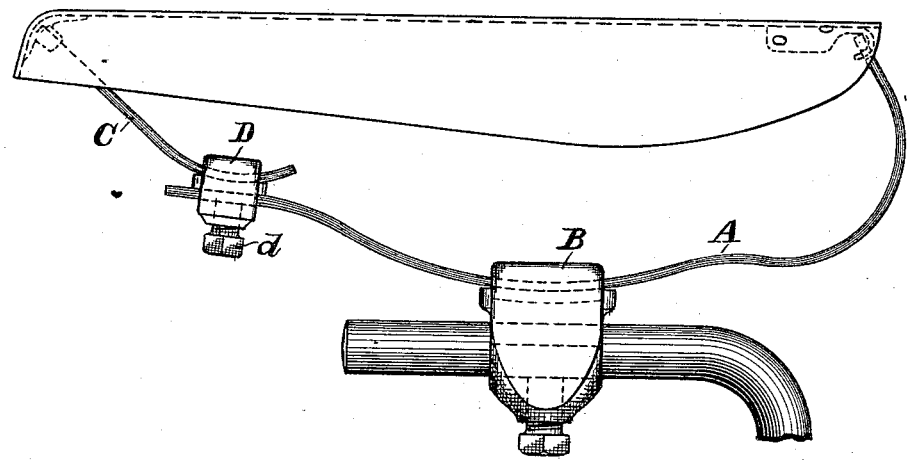

(No Model.)

A. L. GARFORD.
VELOCIPEDE SADDLE.

No. 473,388. Patented Apr. 19, 1892.

WITNESSES.
Frank Meiller.
M. S. Ingham.

INVENTOR.
Arthur L. Garford
By his attorney
E. L. Thurston

UNITED STATES PATENT OFFICE.

ARTHUR L. GARFORD, OF ELYRIA, OHIO.

VELOCIPEDE-SADDLE.

SPECIFICATION forming part of Letters Patent No. 473,388, dated April 19, 1892.

Application filed January 9, 1892. Serial No. 417,560. (No model.)

*To all whom it may concern:*

Be it known that I, ARTHUR L. GARFORD, a citizen of the United States, residing at Elyria, in the county of Lorain and State of Ohio, have invented certain new and useful Improvements in Velocipede-Saddles, of which the following is a specification.

My invention relates to saddles for bicycles, tricycles, and other similar vehicles, generically called "velocipedes."

The primary object of the invention is to provide in a velocipede-saddle novel means for quickly changing the "tilt" or inclination of the seat.

I have shown my invention embodied in a saddle especially designed as a racing-saddle for Safety bicycles. Saddles intended to be used as racing-saddles have usually very little elasticity, and the parts which I hereinafter term "springs" have, as I build the saddle shown, very little spring action. In fact, so far as the invention hereinafter described and claimed is concerned, it matters not whether these parts be rigid or elastic.

I will now proceed to describe the invention especially as embodied in the saddle shown in the drawings, after which I will definitely point out in the claims the combination of parts which constitute the invention.

Figure 2:
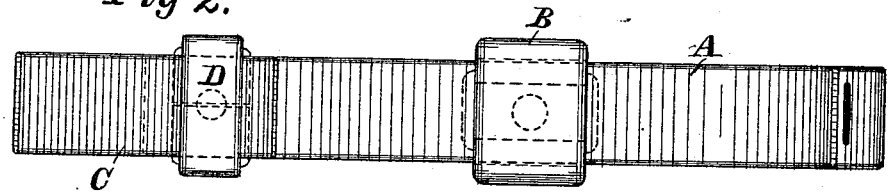
Figure 3:
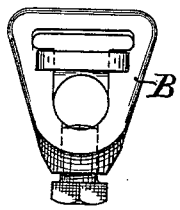

In the drawings, Figure 1 is a side elevation, and Fig. 2 a plan view, (with the seat removed,) of a Safety saddle containing my invention. Fig. 3 is an end view of the clamps which secure the main spring to the saddle-tree.

Referring to the parts by letters, A represents the main saddle-spring, which is connected with one end of the seat-leather in any suitable manner and curves downward and backward and passes through the clip B, by means of which it is secured to the saddle-post or other saddle-support. The precise form of this spring is not material, nor is it material whether said spring be made in one or two pieces or whether it be made of parallel strands of round wire or whether it be made of flat steel-plate, as shown. A hook attached to the saddle-leather enters a slot in the upper end of the spring A, whereby the connection between the seat-leather and said spring is a pivotal connection.

C represents a spring, the upper end of which is attached to the other end of the seat-leather. The lower end of the spring is curved upward—that is to say, it is made concave, (looking down upon it)—and this curved lower end of said spring passes through a clip D, by means of which the springs A and C are fastened together. I prefer to make the spring C of flat steel, although this is not essential. The clip D is movable relatively to either or both springs A and C, and the two springs are clamped together by means of the set-screw $d$ in the clip D. If the clip is moved on the spring A, but not on the spring D, the saddle-leather may be tightened or loosened, as required.

As shown, the spring C is connected with the rear end of the seat-leather; but the tilt of the seat could be changed in the manner hereinafter described if it were the front end of the seat which was attached to the spring C. To relatively raise the rear end of the seat, as shown, the clip D is loosened and the spring C drawn backward through said clip. The seat turns upon its forward connection with the spring A as a pivot, and when the rear end is sufficiently elevated the springs A and C are secured together by means of the clip D and its set-screw $d$. To relatively lower the rear end of the seat, the spring C is moved forward through the clip D.

It is not essential to the broad invention that the clip D, through which the curved lower end of the spring C is adjustable, should be attached to the spring A. It may be attached to a spring otherwise formed or to some part of the velocipede. It is only necessary that some means be provided for supporting the clip D and that the curved spring be adjustable in said clip.

Having thus described my invention, what I claim as new, and desire to secure by Letters Patent, is—

1. In a velocipede-saddle, a seat, a support for one end thereof, a spring connected with the other end of said seat, having an upwardly-curved lower end, a clip in which the curved lower end of said spring is adjustable, and a suitable support for said clip, substantially as set forth.

2. In a velocipede-saddle, a spring A and a clip for securing it to the saddle-support, combined with a spring having an upwardly-curved lower end, an adjustable clip adapted to secure the curved part of said spring to the spring A, and a saddle-seat connected with both springs, the connection with the spring A being a pivotal connection, substantially as specified.

ARTHUR L. GARFORD.

Witnesses:
FRANK. MILLER,
M. S. INGHAM.